(12) United States Patent
Kim

(10) Patent No.: US 8,014,657 B2
(45) Date of Patent: Sep. 6, 2011

(54) PHOTOGRAPHING APPARATUS AND OPTICAL SYSTEM HAVING AN OPTICAL IMAGE STABILIZER FOR DRIVING AN OPTICAL GROUP ALONG A SPHERE CENTERED ON AN APLANATIC POINT

(75) Inventor: Yong-wook Kim, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 522 days.

(21) Appl. No.: 12/126,141

(22) Filed: May 23, 2008

(65) Prior Publication Data

US 2009/0148144 A1 Jun. 11, 2009

(30) Foreign Application Priority Data

Dec. 6, 2007 (KR) .................. 10-2007-0126157

(51) Int. Cl.
*G03B 17/00* (2006.01)

(52) U.S. Cl. .................. 396/55; 348/208.11; 359/557

(58) Field of Classification Search .................. 396/55
See application file for complete search history.

(56) References Cited

U.S. PATENT DOCUMENTS

| | | | | | |
|---|---|---|---|---|---|
| 3,953,106 | A | * | 4/1976 | Furukawa et al. | 359/557 |
| 4,911,541 | A | * | 3/1990 | Alvarez et al. | 359/557 |
| 5,182,671 | A | * | 1/1993 | Kitagishi et al. | 359/557 |
| 5,321,554 | A | * | 6/1994 | Ishiyama et al. | 359/753 |
| 5,731,897 | A | * | 3/1998 | Suzuki | 359/557 |
| 5,771,123 | A | * | 6/1998 | Hamano | 359/557 |
| 5,790,309 | A | * | 8/1998 | Ohtake | 359/557 |
| 6,038,068 | A | * | 3/2000 | Takeshi et al. | 359/399 |
| 6,278,842 | B1 | * | 8/2001 | Yamazaki et al. | 396/55 |
| 7,411,731 | B2 | * | 8/2008 | Ohtake et al. | 359/557 |
| 7,489,861 | B2 | * | 2/2009 | Momochi et al. | 396/52 |
| 7,512,328 | B2 | * | 3/2009 | Suda | 396/52 |
| 7,742,231 | B2 | * | 6/2010 | Ohtake et al. | 359/557 |
| 7,783,179 | B2 | * | 8/2010 | Takahashi | 396/55 |
| 2010/0232020 | A1 | * | 9/2010 | Ohtake et al. | 359/557 |

* cited by examiner

*Primary Examiner* — Christopher E Mahoney
*Assistant Examiner* — Bret Adams
(74) *Attorney, Agent, or Firm* — Stanzione & Kim, LLP

(57) ABSTRACT

A photographing apparatus includes a third optical group arranged between a second optical group and an iris, and to stabilize hand tremor, and the third optical group is moved along a sphere that has a center based on a predetermined point on an optical axis. As a result, a photographing apparatus has an efficient hand tremor stabilization.

18 Claims, 8 Drawing Sheets

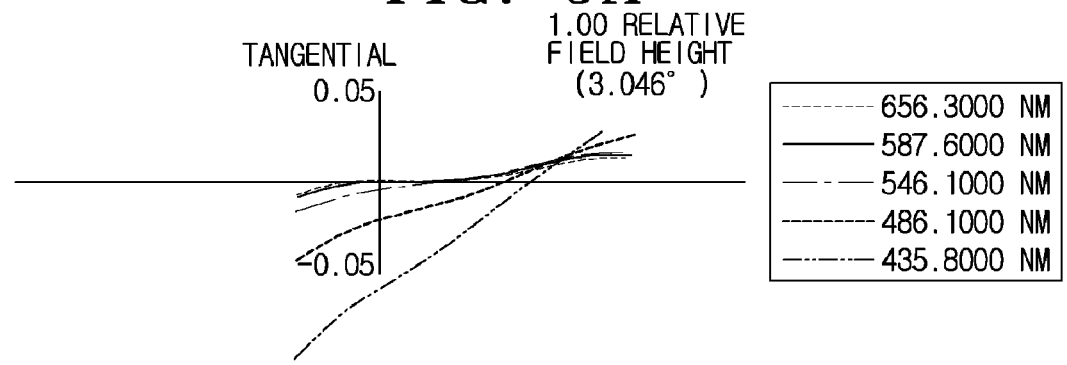
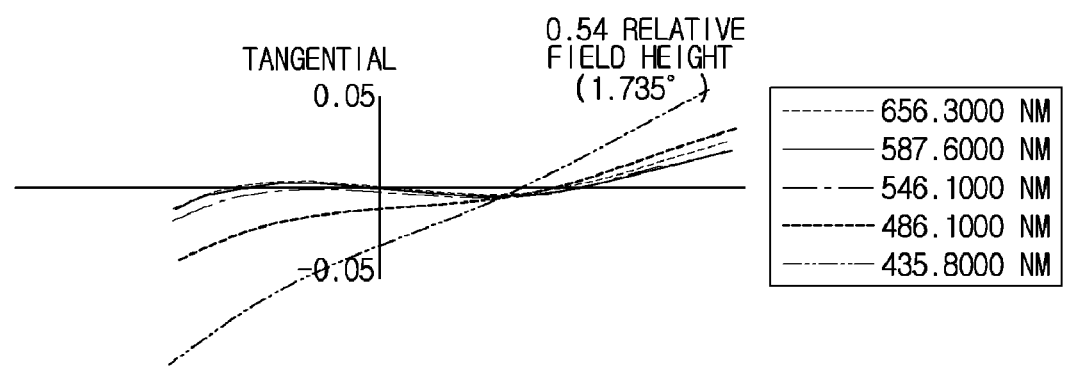
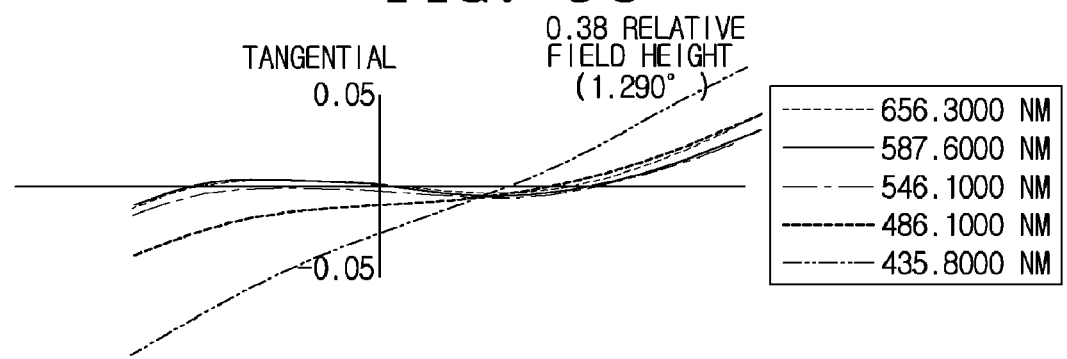
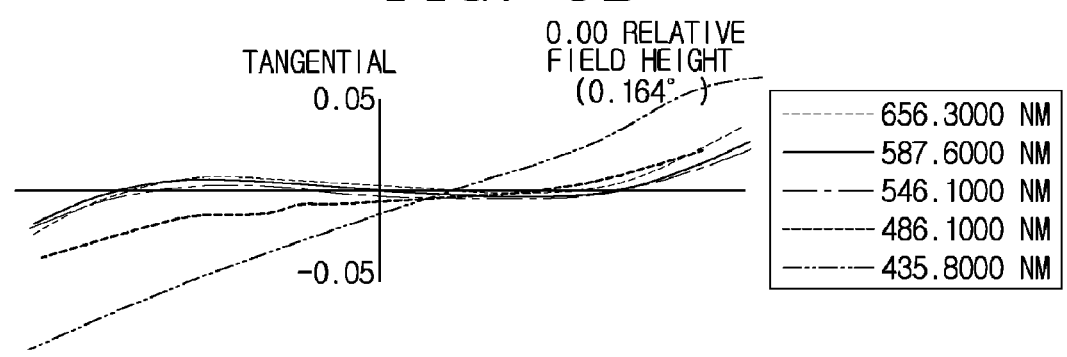

LONGITUDINAL SPHERICAL ABER.

FOCUS (MILLIMETERS)

PHOTOGRAPHING APPARATUS AND OPTICAL SYSTEM HAVING AN OPTICAL IMAGE STABILIZER FOR DRIVING AN OPTICAL GROUP ALONG A SPHERE CENTERED ON AN APLANATIC POINT

CROSS-REFERENCE TO RELATED APPLICATIONS

This application claims priority under 35 U.S.C. §119 (a) from of Korean Patent Application No. 10-2007-0126157, filed on Dec. 6, 2007, in the Korean Intellectual Property Office, the disclosure of which is hereby incorporated herein in its entirety by reference.

BACKGROUND OF THE INVENTION

1. Field of the Invention

The present general inventive concept relates to a photographing apparatus, and more particularly, to a photographing apparatus and an optical system, to optically correct a hand tremor and thereby prevent image quality degradation due to hand tremor by a user.

2. Description of the Related Art

A user of image photographing apparatus, such as digital camera or camcorder, would generally have hand tremor even with an extreme care exhibited by a user. Smaller or more light-weighted cameras or camcorders are more susceptible to the hand tremor. Such hand tremor affects a photographed image, and this problem is specifically worse, if the camera or camcorder is carried around. Therefore, the hand tremor is very important problem to address in order to obtain high quality image.

Particularly, a photographing apparatus with a zoom function is variably influenced by the hand tremor, depending on magnification of the optical system, and thus efficiently preventing the hand tremor within an adjustable range of focal length is difficult.

The hand tremor is stabilized mainly by an electronic manner and an optical manner. As for the electronic manner, there are mainly the Electronic Image Stabilization (EIS) such as a charge coupled device (CCD) control, and the Digital Image Stabilization (DIS) such as field memory vibration control.

However, the CCD electronic image stabilization does not use a portion of the CCD pixels, and thus can have about 20% or 30% of image deterioration compared to the photographing area of the CCD.

As for the optical manner of tremor stabilization, generally a prism is used, or a portion of the lens is moved to stabilize the tremor. It is desirable to use an optical tremor stabilization using the entire CCD pixels to avoid image degradation.

Most of users will prefer a photographing product that is influenced less by the hand tremor. Therefore, a method is required, which can stabilize the hand tremor more efficiently.

SUMMARY OF THE INVENTION

The present general inventive concept provides a photographing apparatus and an optical system, to move a third optical group according to a result of detecting hand tremor and thereby stabilizing the hand tremor.

Additional aspects and utilities of the present general inventive concept will be set forth in part in the description which follows and, in part, will be obvious from the description, or may be learned by practice of the general inventive concept.

The foregoing and other aspects and utilities of the present general inventive concept may be achieved by providing a photographing apparatus including an iris, a first optical group to generate an image based on a subject of photography and to transfer the generated image, a second optical group to adjust a ratio of the image transferred from the first optical group, a third optical group arranged between the second optical group and the iris, to move along a sphere which has a center based on a predetermined point on an optical axis, a fourth optical group to correct aberration of the image passed through the iris and to transfer the corrected image, a fifth optical group to perform focusing so that the image transferred from the fourth optical group is converged on a photographing region, a hand tremor detecting unit to detect hand tremor in a direction of a first axis, vertical with respect to the optical axis, and a direction of a second axis, a driving unit to move the third optical group along the sphere, and a control unit to control the driving unit to move the third optical group, according to a result of detecting hand tremor by the hand tremor detecting unit.

The predetermined point may be an Aplanatic point with respect to the third optical group.

The third optical group may include one lens having a positive refractive power.

The lens may have zero aberration change.

The control unit may cause the third optical group to be moved opposite from the detected hand tremor, along a pathway generated by projecting the first axis or the second axis against the sphere.

The fourth optical group may include a correcting group having a positive refractive power to correct aberration generated due to movement of the third optical group, and a moving group having a negative refractive power to transfer the aberration-corrected image to the fifth optical group.

The fourth optical group may satisfy the condition, $|ff/fr|<1.2$, where ff is a focal length of the correcting group, and fr is a focal length of the moving group.

The correcting group may include two lenses having a positive combined refractive power, and the moving group comprises two lenses having a negative combined refractive power.

The first to fifth optical groups may satisfy:

$$fm = \sqrt{fw \times ft}, \; fam = \sqrt{fmw \times fmt}$$

$$0 < \frac{fm}{fam} < 0.4$$

where, fw denotes a focal length of a wide-angle end of a first optical system, ft denotes a focal length of a tele-end of the first optical system, fmw denotes a focal length of a wide-angle end of a second optical system, and fmt denotes a focal length of a tele-end of the second optical system, wherein the first optical system includes the first to fifth optical groups and the second optical system includes the first to third optical groups.

The driving unit may move the third optical group along the sphere, using a bearing.

The foregoing and other aspects and utilities of the present general inventive concept may be achieved by providing an optical system including an iris, a first optical group to generate an image based on a subject of photography and to transfer the generated image, a second optical group to adjust a ratio of the image transferred from the first optical group, a third optical group arranged between the second optical group and the iris, to move along a sphere which has a center based on a predetermined point on an optical axis, a fourth optical group to correct aberration of the image passed through the iris and to transfer the corrected image, a fifth optical group to perform focusing so that the image transferred from the fourth optical group is converged on a photographing region, and a driving unit to receive a driving signal based on a result of detecting hand tremor from outside, and to move the third optical group along the sphere.

The foregoing and/or other aspects and utilities of the general inventive concept may also be achieved by providing a photographing apparatus including a detection unit to detect movement from an external source, and an optical group to move in response to the detected movement to stabilize the movement of an image.

The movement from the external source may include a hand tremor from a user.

The optical group may move in an opposite direction to the detected movement.

The apparatus may further include a first optical group to collect light beams from a subject of photography, a second optical group to adjust a ratio of a focal length of the image received from the first optical group and an iris.

The optical group may be disposed between the second optical group and the iris.

The optical group may move while maintaining a predetermined distance from an aplanatic point.

The foregoing and/or other aspects and utilities of the general inventive concept may also be achieved by providing a photographing apparatus including a detection unit to detect a hand tremor by a user, and an optical group to move along a sphere having a center while maintaining a predetermined distance from the center, wherein the center is an aplanatic point.

The foregoing and/or other aspects and utilities of the general inventive concept may also be achieved by providing a method of improving image quality of a photographing apparatus, the method including detecting a hand tremor by a user, and moving an optical group along a sphere having an aplanatic point as a center while maintaining a predetermined distance from the center.

The foregoing and/or other aspects and utilities of the general inventive concept may also be achieved by providing a computer-readable recording medium having embodied thereon a computer program to execute a method, wherein the method including detecting a hand tremor by a user, and moving an optical group along a sphere having an aplanatic point as a center while maintaining a predetermined distance from the center.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which:

FIGS. 9A to 9D illustrate Y-axis (tangential) aberration of an optical system having a hand tremor stabilizer according to an example embodiment of the present general inventive concept;

DETAILED DESCRIPTION OF THE PREFERRED EMBODIMENTS

Figure 1:
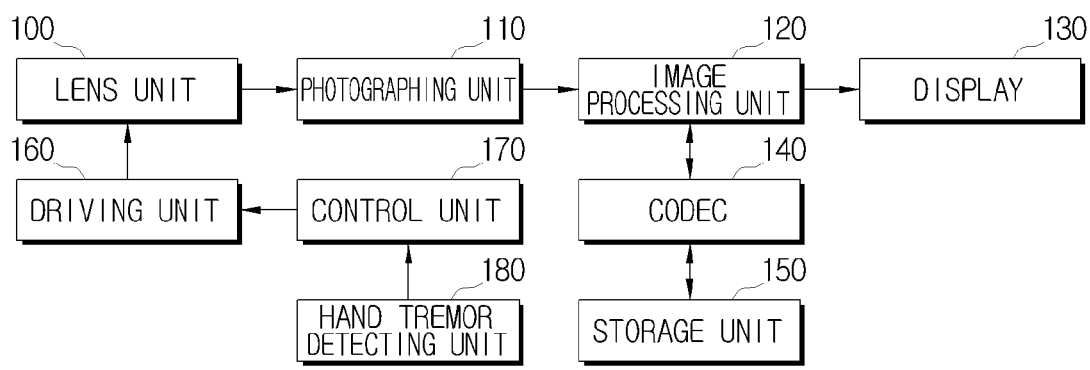
FIG. 1 is a block diagram illustrating a photographing apparatus according to an example embodiment of the present general inventive concept.

Reference will now be made in detail to embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram illustrating a photographing apparatus according to an example embodiment of the present general inventive concept.

Referring to FIG. 1, the photographing apparatus includes a lens unit 100, a photographing unit 110, an image processing unit 120, a display 130, a Codec 140, a storage unit 150, a driving unit 160, a control unit 170, and a tremor detecting unit 180.

The lens unit 100 converges light rays of an object, on a photographing area in the form of an image. The lens unit 100 includes a plurality of lenses, and the lenses are divided into optical groups according to functions.

Some of the lenses of the lens unit 100 are moved along a sphere with a predetermined center, to stabilize hand tremor. The construction and function of the lens unit 100 will be explained below with reference to FIG. 2.

The photographing unit 110 photoelectrically converts incoming light rays into electric signals, and processes a resultant electric signal.

The photographing unit 110 includes pixels and analogue-to-digital (A/D) converter. The pixels output an analog form of image signal, and the A/D converter converts the analog image signal into a digital signal and outputs the result.

The pixels of the photographing unit 110 include a charge-coupled device (CCD), or a complementary metal oxide semiconductor (CMOS) optical sensor. The pixels of the photographing unit 110 read an optical image with a rolling shutter or a global shutter.

The image processing unit 120 processes a signal of an image received from the photographing unit 110, and sends the captured image to the display 130 so that the image can be displayed. The image processing unit 120 outputs the processed image signal to the Codec 140 to store the captured image.

Specifically, the image processing unit 120 performs operations including format conversion of the image signal output from the photographing unit 110, digital zoom to adjust image scale, Auto White Balance (AWB), Auto Focus (AF), and Auto Exposure (AE).

The display 130 displays the image received from the image processing unit 120. Accordingly, the user may view the image displayed on the display 130.

The Codec 140 encodes an image signal received from the image processing unit 120, sends the encoded image signal to the storage unit 150, decodes the encoded image signal stored in the storage unit 150, and sends the decoded image signal to the image processing unit 120.

The storage unit 150 stores an image captured through the photographing unit 120, in a compressed form. The storage unit 150 may be implemented as a flash memory, hard disk, or DVD.

The hand tremor detecting unit 180 detects a displacement angle or linear displacement of the photographing apparatus caused by the user's hand tremor. The hand tremor detecting unit 180 may be implemented as an angle sensor, angular velocity sensor, angular acceleration sensor, position sensor, speed sensor, or acceleration sensor. Accordingly, the hand tremor detecting unit 180 may detect at least one of an angle, angular velocity, angular acceleration, position, speed, or acceleration of the displacement of the photographing apparatus caused by the hand tremor.

Figure 2:
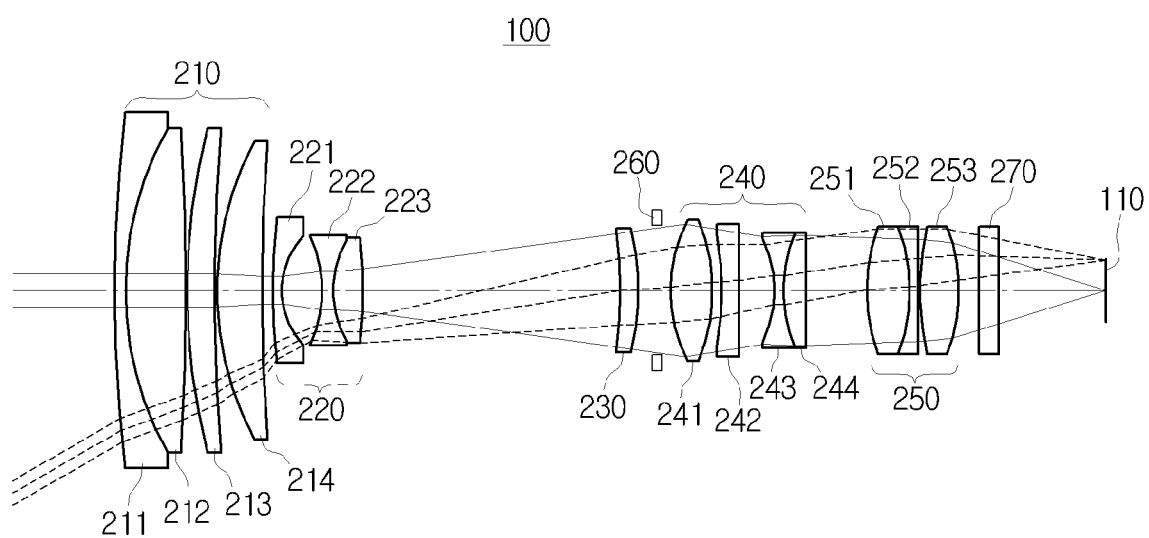
FIG. 2 illustrates a lens unit according to an example embodiment of the present general inventive concept.

The control unit 170 generates a driving signal to move a third optical group 230 of FIG. 2 based on the hand tremor detected by the hand tremor detecting unit 180. The control unit 170 outputs the generated driving signal to the driving unit 160.

Specifically, the control unit 170 controls the driving unit 160 to move the third optical group 230 opposite from a direction where the hand tremor is detected. For example, if hand tremor is detected in the X-axis (Sagittal) direction 310 of FIG. 3, the control unit 170 controls so that the third optical group 230 is moved opposite from the detected hand tremor, along a path obtained by projecting the X-axis against a sphere with a center of Aplanatic point. If hand tremor is detected in the Y-axis (tangential) direction 320 of FIG. 3, the control unit 170 controls the driving unit 160 so that the third optical group 230 is moved opposite from the detected hand tremor, along a path obtained by projecting the Y-axis against a sphere with a center of Aplanatic point.

For example, if the hand tremor detecting unit 180 detects hand tremor in the +x axis direction, the control unit 170 controls the driving unit 160 to move the third optical group 230 in −x direction along the sphere.

The driving unit 160 moves the third optical group 230 based on the received driving signal. More specifically, the driving unit 160 moves the third optical group 230 along a sphere with the center of Aplanatic point existing on an optical axis.

The Aplanatic point is a point where there is zero spherical and coma aberrations. The Aplanatic condition combines a condition to remove spherical aberration and the sine condition to remove coma aberrations.

If the third optical group 230 moves along a sphere with the center of Aplanatic point, the aberration due to hand tremor stabilization can be minimized. As mentioned, the sphere has the center of Aplanatic point, and the radius corresponding to a distance between the Aplanatic point and the third optical group 230. That is, the third optical group 230 is moved, while maintaining a predetermined distance from the Aplanatic point.

The driving unit 160 may be implemented by a combination of a motor and a bearing. For example, the driving unit 160 may control movement of the third optical group, using a X-axis driving motor, and Y-axis driving motor. The driving unit 160 may cause the third optical group 230 to be moved by the driving motor, using a plain bearing or a roller bearing.

As a result, hand tremor is stabilized, as the driving unit 160 moves the third optical group 230.

The construction and operation of the lens unit 100 will be explained in detail below, with reference to FIG. 2.

FIG. 2 illustrates the lens unit 100 according to an exemplary embodiment of the present general inventive concept.

Referring to FIG. 2, the lens unit 100 includes a first optical group 210, a second optical group 220, a third optical group 230, a fourth optical group 240, a fifth optical group 250, an iris 260, and an optical low pass filter (OLPF) 270.

The first optical group 210, or a front lens group, generates an image based on an subject of photography, and transmits the generated image. The first optical group 210 includes one first lens 221 having a negative refractive power, and second to fourth lenses 222, 223, and 224 having positive refractive power.

The first optical group 210 collects light beams received from a subject of photography, thereby helping reduce an overall length of the lens unit 100. The larger first optical group 210 passes a larger amount of light beams, and a higher quality image.

The second optical group 220, or variator lens group, adjusts a ratio of a focal length of an image received from the first optical group 210. That is, the second optical group 220 provides a zooming function.

The third optical group 230 is arranged between the second optical group 220 and the iris, to stabilize a movement of an image due to hand tremor. The third optical group 230 includes an eighth lens having a positive refractive power.

The third optical group 230 is arranged in front of the iris, facing the subject of photography, to perform hand tremor stabilization before an image enters the iris.

The third optical group 230 includes a lens without aberration changes. In order to achieve a lens having zero aberration change, a low refractive power lens is required, since the lower refractive power guarantees lower possibility of having aberration.

The third optical group 230 is moved along a sphere with the center of Aplanatic point. Accordingly, the third optical group 230 is at a predetermined distance from the Aplanatic point.

The Aplanatic point is where the spheric and coma aberrations are removed. Since the third optical group 230 maintains a predetermined distance from the Aplanatic point, the aberration is kept to a minimum even when the third optical group 230 is moved on a hand tremor stabilization purpose.

The movement pattern of the third optical group 230 will be explained in detail below, with reference to FIGS. 3 to 5.

The fourth optical group 240, or relay lens group, corrects the aberration of the image passed through the iris, and sends the corrected image to the fifth optical group 250.

The fourth optical group 240 is divided into a correcting group and a moving group. The correcting group includes a ninth lens 241 having a positive refractive power, and a tenth lens 242 having a negative refractive power. The combined refractive power of the ninth and tenth lenses 241 and 242 of the correcting group is a positive value. The correcting group corrects the aberration generated as the image passes through the first to third optical groups 210 to 230. Specifically, the correcting group corrects the hand tremor-generated aberration.

The moving group is implemented by a combination of the eleventh lens 243 having a negative refractive power, and a twelfth lens 243 having a positive refractive power and coupled to the eleventh lens 243. The combined refractive power of the eleventh and twelfth lenses 243 and 244 is a negative value. The moving group transmits the image to the fifth optical group 250.

The fourth optical group 240 satisfies a condition, |ff/fr|<1.2, where ff is a focal length of the correcting group, and fr is a focal length of the moving group. Only with the above condition met, the fourth optical group 240 is able to transmit a stable image of the subject of photography.

The fifth optical group 250, or focusing lens unit, focuses a received image onto the photographing unit 110. The fifth optical group 250 includes a thirteenth lens 251 having a positive refractive power, a fourteenth lens 252 having a negative refractive power, and a fifteenth lens 253 having a positive refractive power.

The fifth optical group 250 focuses the received image onto the photographing unit 110, to thus cause the image to converge on the photographing unit 110.

The iris 260 adjusts an amount of light passing the lens unit 100. With the iris 260 widened, the lens unit 100 passes more amount of light, thereby providing a brighter, but lower-depth image. With the iris 260 narrowed, the lens unit 100 passes less amount of light, thereby providing a darker, but higher-depth image.

The OLPF 270 adjusts the light amount to an optimum amount of light. Additionally, the OLPF 270 filters out high frequency light to prevent image abnormalities such as the one generated due to ultraviolet rays.

The construction of the lens unit 100 has been explained so far with reference to FIG. 2.

The first to fifth optical'groups 210 to 250 of the first optical system satisfy the following to provide a stable image of the subject of photography:

$$fm = \sqrt{fw \times ft},$$
$$fam = \sqrt{fmw \times fmt}$$
[Mathematical expression 1]

$$0 < \frac{fm}{fam} < 0.4$$
[Mathematical expression 2]

where, fw denotes a focal length of a wide-angle end of a first optical system, ft denotes a focal length of a tele-end of the first optical system, fmw denotes a focal length of a wide-angle end of a second optical system, and fmt denotes a focal length of a tele-end of the second optical system, wherein the first optical system comprises the first to fifth optical groups 210 to 250 and the second optical system includes the first to third optical groups 210 to 230.

The first to fifth optical groups 210 to 250 of the lens unit 100 are arranged in the manner of satisfying the above conditions.

The lens unit 100 also includes a separate third optical group 230 for the purpose of hand tremor correction (image stabilization), so that correcting the hand tremor by moving the third optical group 230 only is possible.

While the exemplary embodiment above explained that the lens unit 100 and the driving unit 160 are included in the photographing apparatus, this is only for the purpose of example, and the lens unit 100 and the driving unit 160 can be implemented as separate optical systems. For example, an optical system lens apparatus exclusively equipped with the lens unit 100 and the driving unit 160, can be removably mounted in the photographing apparatus.

The manner of moving the third optical group 230 will be explained below with reference to FIGS. 3 to 5. FIG. 3 illustrates the third optical group according to an exemplary embodiment of the present general inventive concept.

Figure 3:
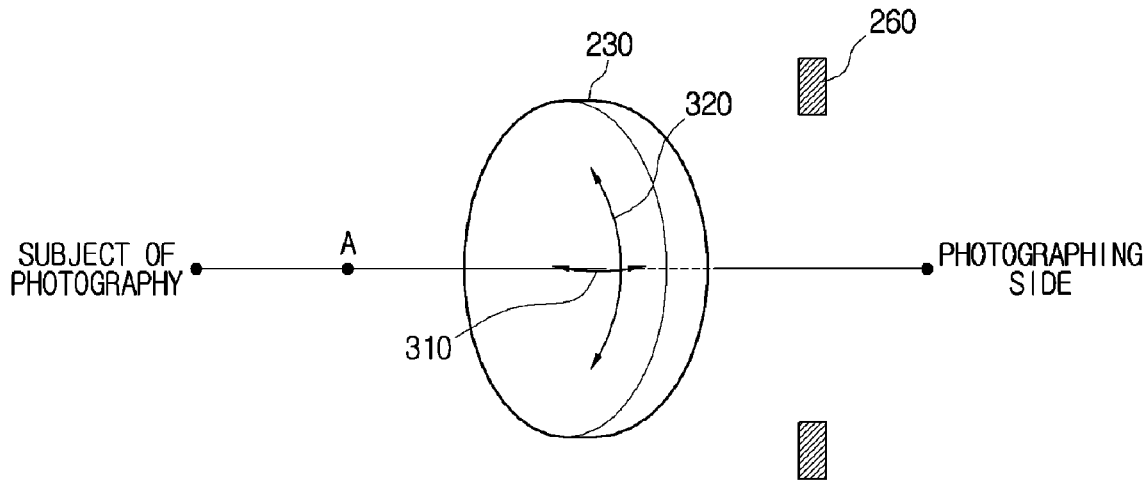
FIG. 3 illustrates a third optical group according to an example embodiment of the present general inventive concept.

Referring to FIG. 3, the third optical group 230 is disposed in front of the iris 260 (that is, closer to the subject of photography). The symbol 'A' denotes the Aplanatic point.

The third optical group 230 is movable in X-axis direction 310 and Y-axis direction 320, with reference to a sphere having the center A. The center of the third optical group 230 remains a predetermined distance from the Aplanatic point A, even when the third optical group 230 moves.

The Aplanatic point A is where there is zero aberration. Accordingly, since the third optical group 230 is moved at a predetermined distance from the Aplanatic point A, the third optical group 230 has minimum aberration.

The movement of the third optical group according to hand tremor, will be explained below with reference to FIGS. 4 and 5.

Figure 4:
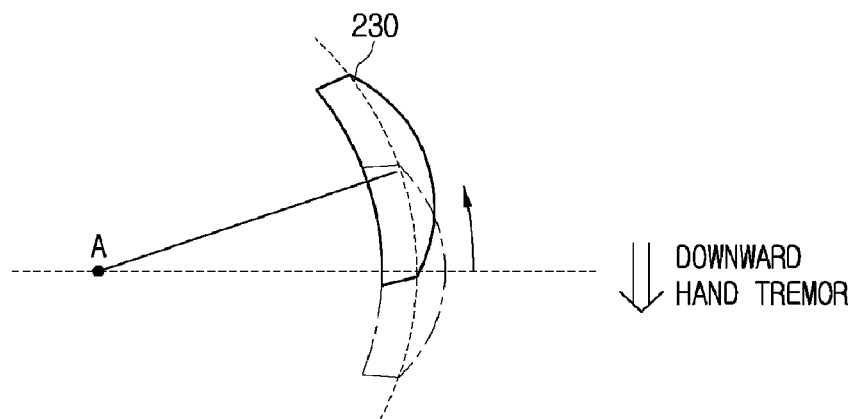
FIG. 4 illustrates a state in which a downward hand tremor occurs, according to an example embodiment of the present general inventive concept.

FIG. 4 illustrates a state in which a downward hand tremor is generated, according to an exemplary embodiment of the present general inventive concept.

Referring to FIG. 4, the third optical group 230 moves upwardly, when the downward hand tremor applies. Instead of moving vertically with respect to the optical axis, the third optical group 230 moves in a Y-axis direction 320 along a sphere that has a center A, and a radius corresponding to a distance between A and the third optical group 230. As a result, the third optical group 230 maintains a predetermined distance from A.

Figure 5:
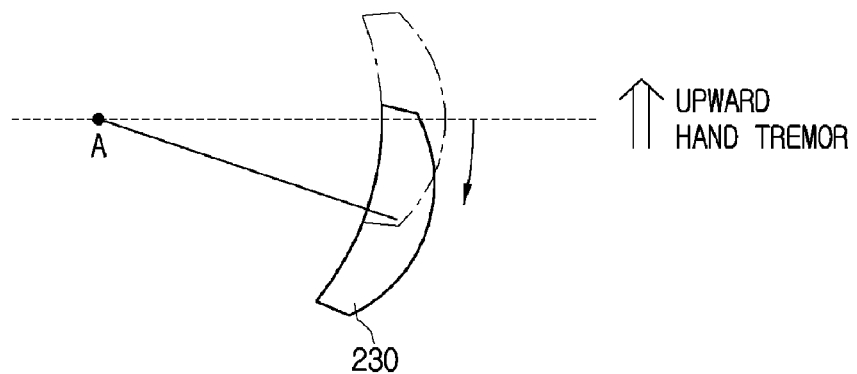
FIG. 5 illustrates a state in which an upward hand tremor occurs, according to an example embodiment of the present general inventive concept.
Figure 6A:
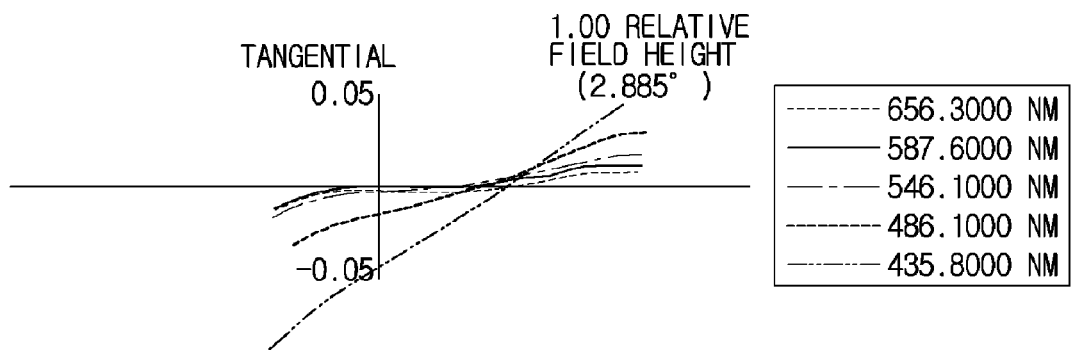
FIGS. 6A to 6D illustrate Y-axis (tangential) aberration of an optical system having no hand tremor stabilizer.
Figure 6B:
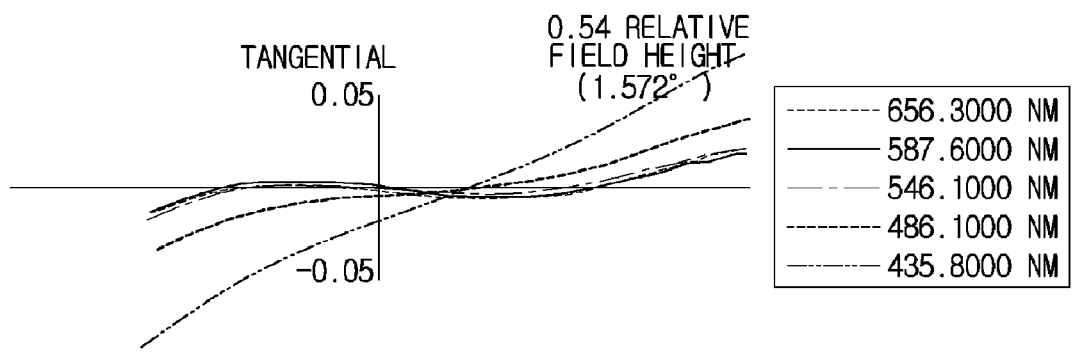
Figure 6C:
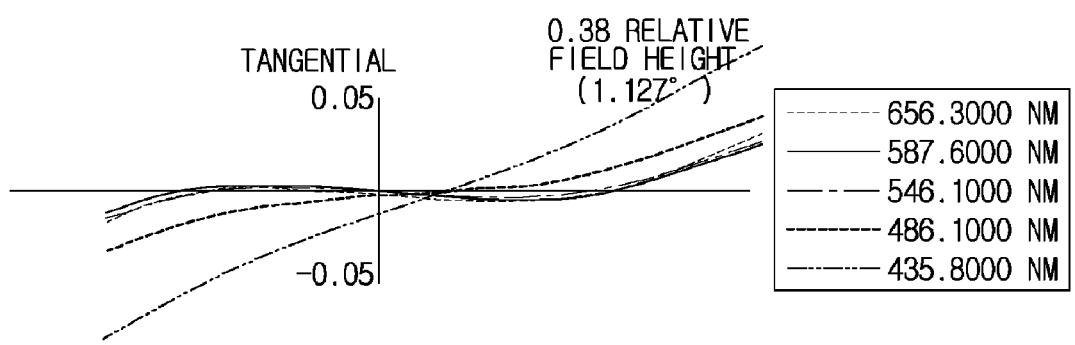
Figure 6D:
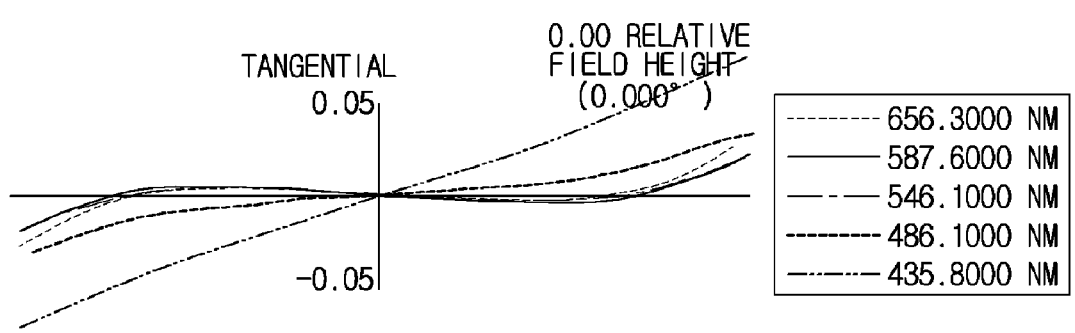
Figure 7A:
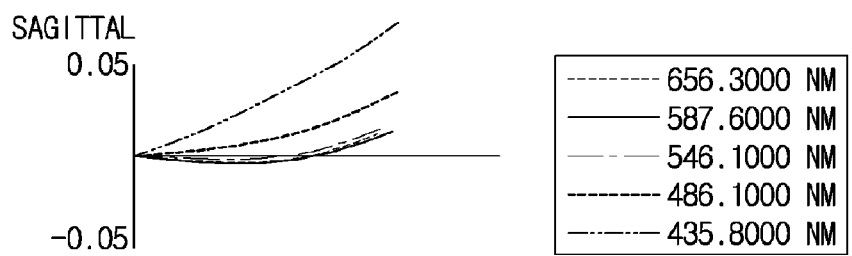
FIGS. 7A to 7D illustrate X-axis (Sagittal) aberration of an optical system having no hand tremor stabilizer.
Figure 7B:
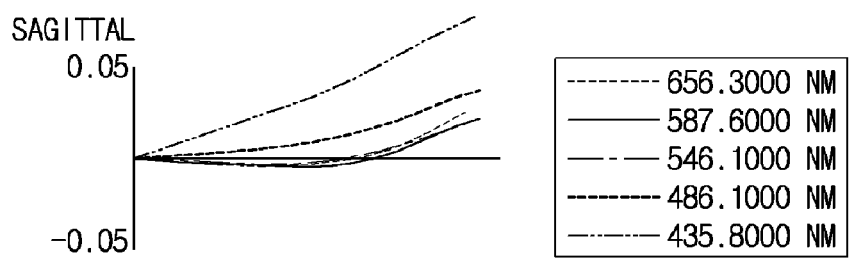
Figure 7C:
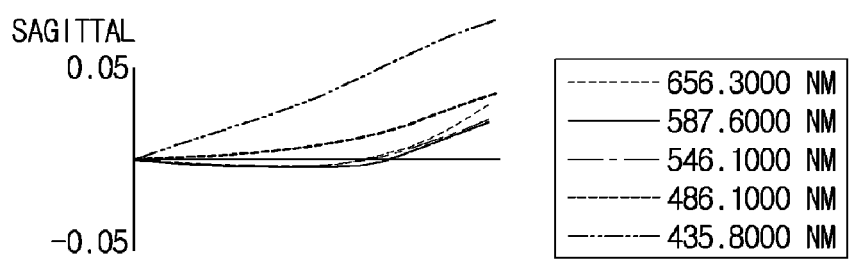
Figure 7D:

FIG. 5 illustrates a state in which an upward hand tremor is generated, according to an exemplary embodiment of the present general inventive concept.

Referring to FIG. 5, the third optical group 230 moves downwardly, when the upward hand tremor applies. Instead of moving vertically with respect to the optical axis, the third optical group 230 moves in a Y-axis direction 320 along a sphere that has a center A, and a radius corresponding to a distance between A and the third optical group 230. As a result, the third optical group 230 maintains a predetermined distance from A.

While FIGS. 4 and 5 illustrate the Y-axis direction 320, the third optical group 230 according to an exemplary embodiment of the present general inventive concept can also move in X-axis direction 310. Accordingly, if hand tremor occurs in the X-axis direction 310, the third optical group 230 moves opposite to the hand tremor direction, along the X-axis projected on the sphere.

Since the third optical group 230 moves compensatively according to the detection result of hand tremor, the third optical group 230 can perform hand tremor correction. As a result, an apparatus to stabilize a hand tremor by moving the third optical group 230 is provided.

The aberrations of a photographing apparatus having a hand tremor stabilizer according to an exemplary embodiment of the present general inventive concept will be explained below with reference to FIGS. 6A to 11.

FIGS. 6A to 6D illustrate Y-axis aberration of an optical system having no hand tremor stabilizer. Specifically, the Y-axis aberration of FIGS. 6A to 6D appears when the relative field heights are 1, 0.54, 0.38, and 0.00.

FIGS. 7A to 7D illustrate X-axis aberration of an optical system having no hand tremor stabilizer. Specifically, the X-axis aberration of FIGS. 6A to 6D appears when the relative field heights are 1, 0.54, 0.38, and 0.00.

Figure 8:
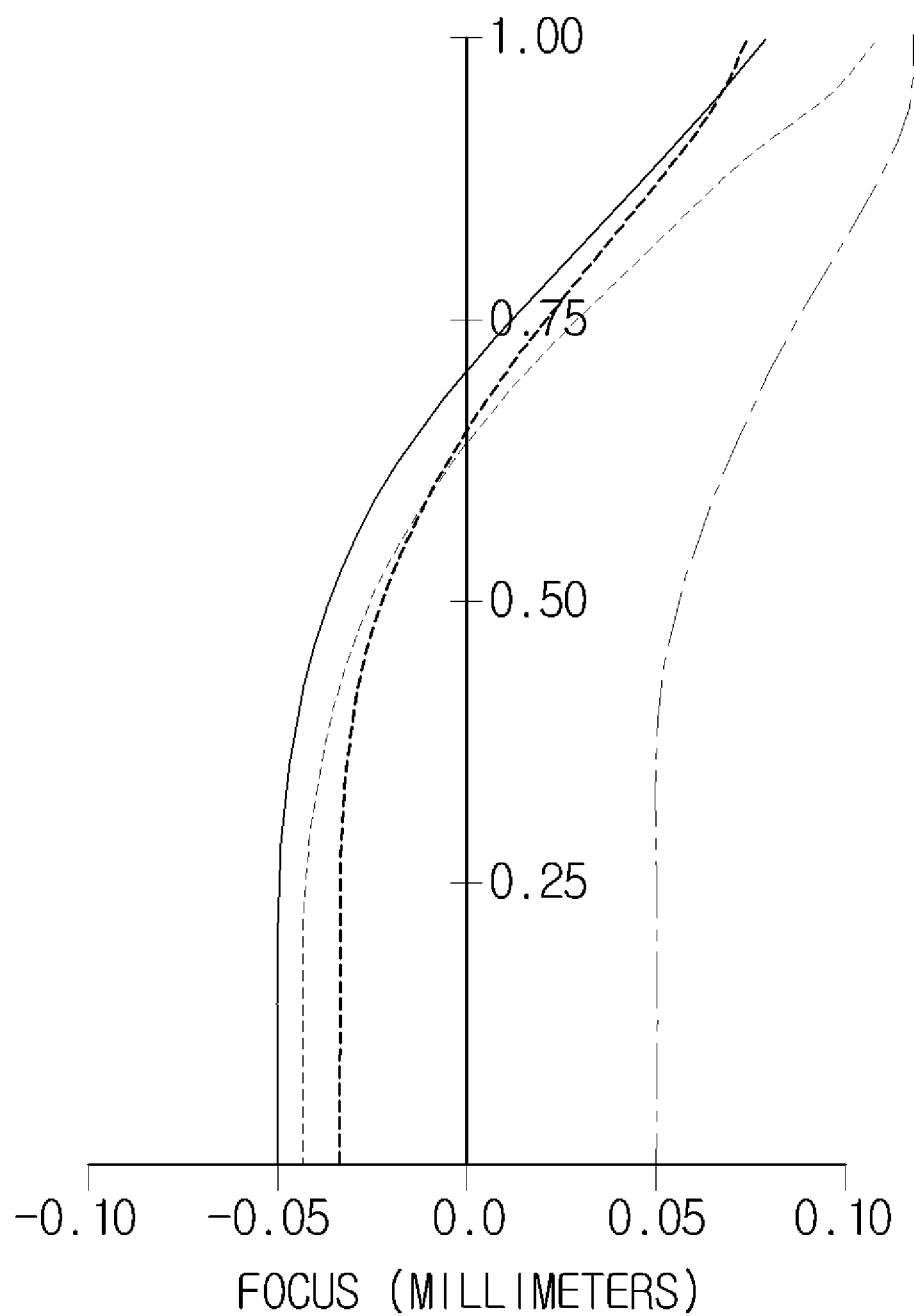
FIG. 8 illustrates an optical-axis (longitudinal) aberration of an optical system having no hand tremor stabilizer.
Figure 10A:
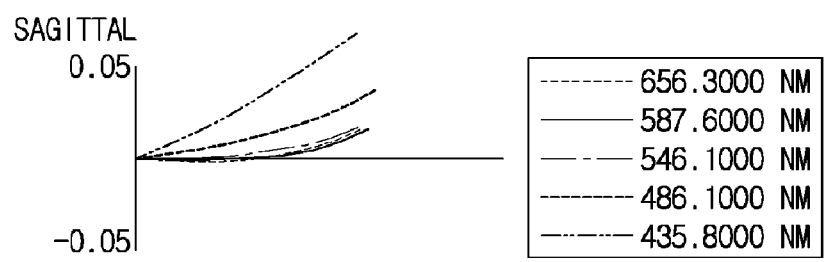
FIGS. 10A to 10D illustrate X-axis (Sagittal) aberration of an optical system having a hand tremor stabilizer according to an example embodiment of the present general inventive concept.
Figure 10B:
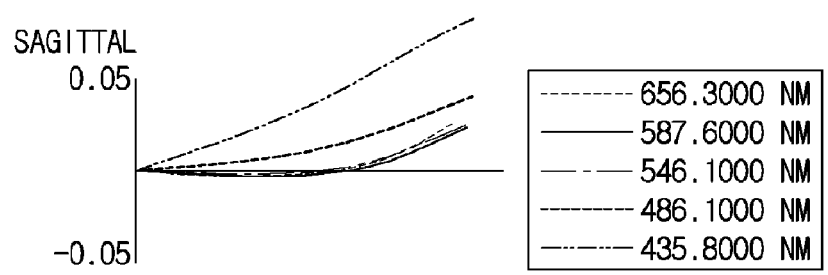
Figure 10C:
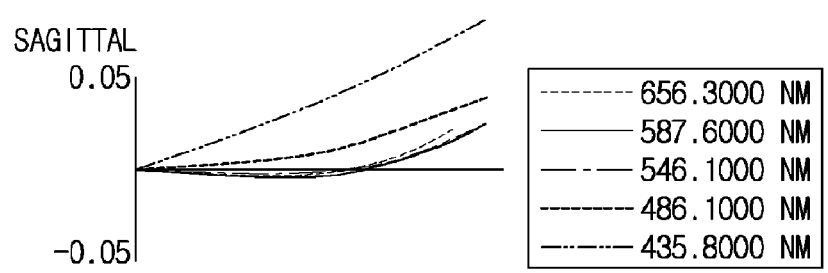
Figure 10D:
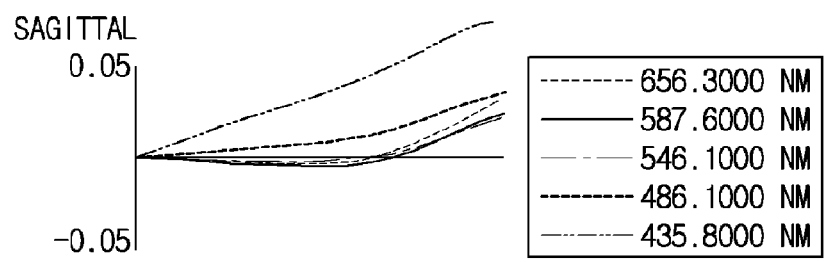

FIG. 8 illustrates an optical-axis (longitudinal) aberration of an optical system having no hand tremor stabilizer. Specifically, the graphical representation of FIG. 8 indicates the degree of spheric aberration in the optical axis direction of the optical system.

FIGS. 9A to 9D illustrate Y-axis aberration of an optical system having a hand tremor stabilizer according to an example embodiment of the present general inventive concept. Specifically, the Y-axis aberration of FIGS. 9A to 9D appears when the relative field heights are 1, 0.54, 0.38, and 0.00.

FIGS. 10A to 10D illustrate X-axis aberration of an optical system having a hand tremor stabilizer according to an example embodiment of the present general inventive concept. Specifically, the X-axis aberration of FIGS. 10A to 10D appear when the relative field heights are 1, 0.54, 0.38, and 0.00.

Figure 11:
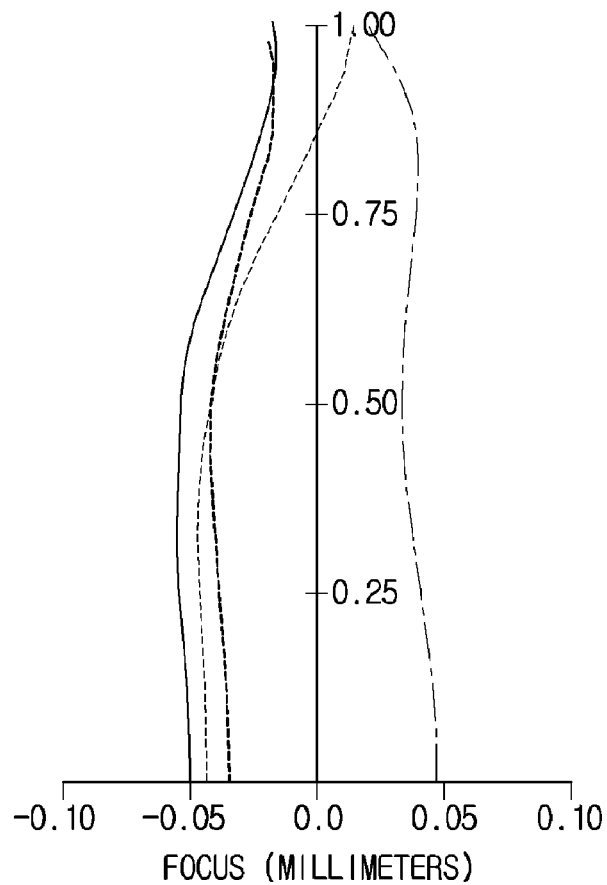
FIG. 11 illustrates optical-axis (longitudinal) aberration of an optical system having a hand tremor stabilizer according to an example embodiment of the present general inventive concept.

FIG. 11 illustrates optical-axis aberration of an optical system having a hand tremor stabilizer according to an example embodiment of the present general inventive concept. Specifically, the graphical representation of FIG. 11 indicates the degree of spheric aberration in the optical axis direction of the optical system.

When FIGS. 6A to 8 are compared with FIGS. 9A to 11, there is little degradation of aberration. Therefore, the optical system having the hand tremor stabilizer according to the exemplary embodiments of the present general inventive concept are appropriate for use in a photographing apparatus.

Furthermore, when FIG. 8 is compared with FIG. 11, FIG. 11 provides better performance of stabilizing the spheric aberration when the relative field height is close to '1'.

Accordingly, FIGS. 6A to 11 illustrate that the optical system according to the exemplary embodiments of the present general inventive concept has a function of stabilizing hand tremor, and also minimizes aberration.

Figure 12:
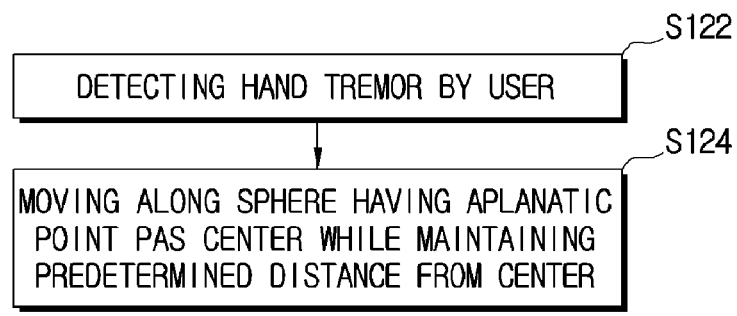
FIG. 12 is a flowchart illustrating a method of improving image quality of a photographing apparatus according to an embodiment of the present general inventive concept.

FIG. 12 is a flowchart illustrating a method of improving image quality of a photographing apparatus according to an embodiment of the present general inventive concept. Referring to FIGS. 3 and 2, in operation S122, a hand tremor by a user is detected. In operation S124, an optical group 230 is moved along a sphere having an aplanatic point P as a center while maintaining a predetermined distance from the center.

The present general inventive concept can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

The photographing apparatus explained above according to the exemplary embodiments of the present general inventive concept mainly includes a camcorder, a digital camera, or a video camera.

Since a photographing apparatus and an optical system move a third optical group along a spheric surface according to a result of detecting hand tremor, hand tremor is stabilized more efficiently.

Furthermore, since a separate third optical group is employed for the purpose of hand tremor stabilization, moving the other optical groups is unnecessary and thus image quality is improved.

Furthermore, since the third optical group rotates with reference to the Aplanatic point, aberration due to hand tremor stabilization is kept minimum.

Although various embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A photographing apparatus, comprising:
    an iris;
    a first optical group to generate an image based on a subject of photography and to transfer the generated image;
    a second optical group to adjust a ratio of the image transferred from the first optical group;
    a third optical group arranged between the second optical group and the iris, to move along a sphere which has a center based on a predetermined point on an optical axis, wherein the predetermined point is an Aplanatic point with respect to the third optical group;
    a fourth optical group to correct aberration of the image passed through the iris and to transfer the corrected image;
    a fifth optical group to perform focusing so that the image transferred from the fourth optical group is converged on a photographing region;
    a hand tremor detecting unit to detect hand tremor in a direction of a first axis, vertical with respect to the optical axis, and a direction of a second axis;
    a driving unit to move the third optical group along the sphere; and
    a control unit to control the driving unit to move the third optical group, according to a result of detecting hand tremor by the hand tremor detecting unit.

2. The photographing apparatus of claim 1, wherein the third optical group comprises:
    one lens having a positive refractive power.

3. The photographing apparatus of claim 2, wherein the lens has zero aberration change.

4. The photographing apparatus of claim 1, wherein the control unit causes the third optical group to be moved opposite from the detected hand tremor, along a pathway generated by projecting the first axis or the second axis against the sphere.

5. The photographing apparatus of claim 1, wherein the fourth optical group comprises:
    a correcting group having a positive refractive power to correct aberration generated due to movement of the third optical group; and
    a moving group having a negative refractive power to transfer the aberration-corrected image to the fifth optical group.

6. The photographing apparatus of claim 5, wherein the fourth optical group satisfies the condition, |ff/fr|<1.2, where ff is a focal length of the correcting group, and fr is a focal length of the moving group.

7. The photographing apparatus of claim 5, wherein the correcting group comprises two lenses having a positive combined refractive power, and the moving group comprises two lenses having a negative combined refractive power.

8. The photographing apparatus of claim 1, wherein the first to fifth optical groups satisfy:

$$fm = \sqrt{fw \times ft}, \ fam = \sqrt{fmw \times fmt}$$
$$0 < \frac{fm}{fam} < 0.4$$

where, fw denotes a focal length of a wide-angle end of a first optical system, ft denotes a focal length of a tele-end of the first optical system, fmw denotes a focal length of a wide-angle end of a second optical system, and fmt denotes a focal length of a tele-end of the second optical system, wherein the first optical system includes the first to fifth optical groups and the second optical system includes the first to third optical groups.

9. The photographing apparatus of claim 1, wherein the driving unit moves the third optical group along the sphere, using a bearing.

10. An optical system, comprising:
an iris;
a first optical group to generate an image based on a subject of photography and to transfer the generated image;
a second optical group to adjust a ratio of the image transferred from the first optical group;
a third optical group arranged between the second optical group and the iris, to move along a sphere which has a center based on a predetermined point on an optical axis, wherein the predetermined point is an Aplanatic point with respect to the third optical group;
a fourth optical group to correct aberration of the image passed through the iris and to transfer the corrected image;
a fifth optical group to perform focusing so that the image transferred from the fourth optical group is converged on a photographing region; and
a driving unit to receive a driving signal based on a result of detecting hand tremor from outside, and to move the third optical group along the sphere.

11. A photographing apparatus, comprising:
a detection unit to detect movement from an external source; and
a third optical group to move along the surface of a sphere while maintaining a predetermined distance from an Aplanatic point of the third optical group in response to the detected movement to stabilize the movement of an image.

12. The apparatus of claim 11, wherein the movement from the external source comprises:
a hand tremor from a user.

13. The apparatus of claim 11, wherein the third optical group moves in an opposite direction to the detected movement.

14. The apparatus of claim 11, further comprising:
a first optical group to collect light beams from a subject of photography;
a second optical group to adjust a ratio of a focal length of the image received from the first optical group; and
an iris.

15. The apparatus of claim 14, wherein the third optical group is disposed between the second optical group and the iris.

16. A photographing apparatus, comprising:
a detection unit to detect a hand tremor by a user; and
an optical group to move along a sphere in response to the detected hand tremor while maintaining a predetermined distance from the center of the sphere,
wherein the center is an Aplanatic point with respect to the optical group.

17. A method of improving image quality of a photographing apparatus, the method comprising:
detecting a hand tremor by a user; and
moving an optical group along a sphere having an aplanatic point as a center while maintaining a predetermined distance from the center.

18. A non-transitory computer-readable recording medium having embodied thereon a computer program to execute a method, wherein the method comprises:
detecting a hand tremor by a user; and
moving an optical group along a sphere having an aplanatic point as a center while maintaining a predetermined distance from the center.

* * * * *